United States Patent
Fischer et al.

(10) Patent No.: US 8,811,708 B2
(45) Date of Patent: Aug. 19, 2014

(54) QUANTIFICATION OF MEDICAL IMAGE DATA

(75) Inventors: Alexander Fischer, Aachen (DE); Uma Satya Ranjan, Bangalore (IN); Utpal Kumar, Bokaro Steel (IN)

(73) Assignee: Koninklijke Philips N.V., Eindhoven (NL)

( * ) Notice: Subject to any disclaimer, the term of this patent is extended or adjusted under 35 U.S.C. 154(b) by 466 days.

(21) Appl. No.: 13/263,764

(22) PCT Filed: Apr. 12, 2010

(86) PCT No.: PCT/IB2010/051564
§ 371 (c)(1),
(2), (4) Date: Oct. 10, 2011

(87) PCT Pub. No.: WO2010/119388
PCT Pub. Date: Oct. 21, 2010

(65) Prior Publication Data
US 2012/0033865 A1     Feb. 9, 2012

(30) Foreign Application Priority Data
Apr. 15, 2009   (EP) .................................... 09157932

(51) Int. Cl.
*G06K 9/00* (2006.01)
*G06K 9/32* (2006.01)
*G06T 3/00* (2006.01)
*G06T 7/00* (2006.01)

(52) U.S. Cl.
CPC ............. *G06T 7/0012* (2013.01); *G06T 7/0024* (2013.01); *G06T 2207/30004* (2013.01); *G06T 2207/10072* (2013.01); *G06T 2207/20104* (2013.01)
USPC ........... 382/131; 382/128; 382/130; 382/132; 382/294

(58) Field of Classification Search
CPC ... G06T 7/0012; G06T 7/0024; G06T 3/0068; G06T 7/003; A61B 5/0035; A61B 5/7425; A61B 5/7435; A61B 5/748; A61B 6/5229; A61B 6/5235; A61B 6/5247
USPC .......................... 382/131, 128, 130, 132, 294
See application file for complete search history.

(56) References Cited

U.S. PATENT DOCUMENTS 7,397,934 B2 *   7/2008   Bloch et al. .................... 382/128
7,616,799 B2 *   11/2009   Ramamurthy et al. ....... 382/131

(Continued)

OTHER PUBLICATIONS

Kramer et al. "CT-SPECT Fusion for Analysis of Radiolabeled Antibodies: Applications in Gastrointestinal and Lung Carcinoma." Nucl. Med. Biol.. 18.1 (1991): 27-41. Print.*
Katyal, S., et al.; Fusion of Immunoscintigraphy Single Photon Emission Computed Tomography (SPECT) with CT of the Chest in Patients with Non-Small Cell Lung Cancer; 1995; Cancer Research; vol. 55; pp. 5759S-5763S.

(Continued)

*Primary Examiner* — Michael A Newman (57) ABSTRACT

A system is provided for quantification of medical image data. First image obtaining means (1) are for obtaining a first image (A). Second image obtaining means (2) are for obtaining a second image (B). Spatial transformation obtaining means (3) are for obtaining spatial transformation information representing a correspondence between points in the first image and corresponding points in the second image. Identifying means (4) are for identifying a first image region (C) in the first image (A). Transforming means (5) are for transforming the first image region (C) into a corresponding second image region C') in the second image (B) based on the spatial transformation information. Quantification means (6) are for computing a quantification relating to the second image region (C') by accessing image values of the second image (B) within the second image region (C').

14 Claims, 3 Drawing Sheets

(56) References Cited

U.S. PATENT DOCUMENTS

| | | | |
|---|---|---|---|
| 7,935,055 B2* | 5/2011 | Burckhardt | 600/300 |
| 8,165,425 B2* | 4/2012 | DeClerck | 382/294 |
| 2005/0031176 A1* | 2/2005 | Hertel et al. | 382/128 |
| 2005/0065421 A1* | 3/2005 | Burckhardt | 600/407 |
| 2007/0049817 A1* | 3/2007 | Preiss et al. | 600/407 |
| 2008/0125639 A1* | 5/2008 | Ding | 600/407 |
| 2008/0298664 A1* | 12/2008 | Martin et al. | 382/131 |
| 2009/0052757 A1* | 2/2009 | Khamene et al. | 382/131 |

OTHER PUBLICATIONS

Kramer, E. L., et al.; CT-SPECT Fusion for Analysis of Radiolabeled Antibodies: Applications in Gastrointestinal and Lung Carcinoma; 1991; Intl. Journal of Radiation Applications and Instrumentation; Part B: Nuclear Medicine and Biology; 18(1)27-42.

Noz, M. E., et al.; A Versatile Functional-Anatomic Image Fusion Method for Volume Data Sets; 2001; Journal of Medical Systems; 25(5)297-307.

* cited by examiner

QUANTIFICATION OF MEDICAL IMAGE DATA

FIELD OF THE INVENTION

The invention relates to quantification of medical image data.

BACKGROUND OF THE INVENTION

In clinical and preclinical research studies, data from various modalities are used to aid investigation regarding a drug or treatment. Data from multiple modalities (such as CT, MR, PET or SPECT) yield different information, and a combination of such information may be used in order to arrive at a conclusion. For example, PET and SPECT data may yield functional information, whereas CT and MR may yield anatomical information. In order to fuse such information, the anatomical region to be studied (such as an organ or a tumor region) may be first delineated in the CT or MR image. The functional ability of the same region is then studied via information from PET or SPECT images. In order to ensure that the same region is studied in both the modalities, an initial registration between the images may be carried out of the data to ensure that the size, overlap and orientation of the two images are comparable. In addition, registration may also be performed to compensate for differences in acquisition conditions, biological variability, and motion. However, the assessment of functional ability allows for improvement.

SUMMARY OF THE INVENTION

It would be advantageous to have an improved system for quantification of medical image data. To better address this concern, in a first aspect of the invention a system is presented that comprises:

spatial transformation obtaining means for obtaining spatial transformation information representing a correspondence between points in a first image and corresponding points in a second image;

identifying means for identifying a first image region in the first image; transforming means for transforming the first image region into a corresponding second image region in the second image based on the spatial transformation information; and quantification means for computing a quantification relating to the second image region by accessing image values of the second image within the second image region.

The spatial transformation information is used to transform the first image region into the corresponding second image region in the second image. This way, the region of the image which has to be quantified is defined with respect to the original second image, which allows the quantification to be performed by accessing the original values of the second image within the second image region. Because the quantification means accesses the original image values of the second image, the quantification is more accurate compared to the situation in which the quantification is performed by accessing resampled and/or filtered image values of the second image.

The first image may comprise an anatomical image. The second image may comprise a functional image. This combination is advantageous because it is relatively easy to identify a region of interest (first image region) in an anatomical image, whereas the functional information of the functional image in the corresponding region of interest (second image region) in the functional image may contain information of which a quantification is desired.

The spatial transformation obtaining means may comprise registering means for registering at least part of the first image with at least part of the second image to obtain the spatial transformation information. Such a registration of two images, in particular medical images, is known in the art per se. The registration can result in resampled image data, however, this data need not be used in the quantification. Instead, the original image values in the second image region may be accessed.

The identifying means may be arranged for providing a boundary of the first image region. The transforming means may be arranged for transforming the boundary based on the spatial transformation information to obtain a boundary of the second image region. It is relatively easy to identify a region by defining the boundary of the region. Moreover, such boundary can be transformed relatively easily using spatial transformation. The boundary of the region may be represented, for example, by a number of points on the boundary. Such points can be subjected to the spatial transformation.

The identifying means may comprise a user interface for enabling a user to indicate the first image region in the first image. This allows the user to determine the first image region, for example a region of interest for which a quantification of second image data is desired.

The spatial transformation information may represent a rigid, affine, non-rigid, or landmark-based transformation. Such transformations are suitable spatial transformations for registration purposes and for transforming the first image region into the second image region.

The system may comprise storage means for storing the spatial transformation information. By storing the spatial transformation information, the spatial transformation can be applied to the first image region, making it unnecessary to store and/or use the registered, interpolated version of the first or second images.

The storage means may be arranged for further storing a series instance identifier, origin, pixel spacing, and/or image orientation of the first image and/or of the second image. This information helps to accurately map the first image region into the corresponding second image region. The series instance identifier may comprise a Universal ID (UID).

The system may comprise associating means for associating the quantification with the first image region. As the image regions correspond, typically the quantification corresponds to the first image region of the first image. Said associating means makes use of this correspondence.

The system may comprise association visualizing means for visualizing an indication of the association between the quantitative value and the first image region. This conveys the association to a user.

The system may comprise region visualizing means for visualizing an indication of the second image region in the second image. This allows the user to assess the second image region. If the user is not satisfied, user interface means may be provided enabling the user to adjust the second image region before performing the quantification.

The system may comprise comparison means for comparing the quantification with a further quantification obtained by accessing image values in a corresponding region in a registered image, wherein the registered image has been obtained by deforming the second image to register the second image with the first image. This allows to assess the effect of registration on the quantification.

A medical image acquisition apparatus may comprise means for acquiring the first image or the second image and further comprising the system for quantification of medical image data set forth. A medical workstation may comprise the system for quantification of medical image data set forth.

A method of quantification of image data may comprise the steps of obtaining spatial transformation information representing a correspondence between points in the first image and corresponding points in the second image;

identifying a first image region in the first image;

transforming the first image region into a corresponding second image region in the second image based on the spatial transformation information; and computing a quantification relating to the second image region by accessing image values of the second image within the second image region.

A computer program product may comprise instructions for causing a processor system to perform the steps of the method set forth.

It will be appreciated by those skilled in the art that two or more of the above-mentioned features and/or aspects of the invention may be combined in any way deemed useful.

Modifications and variations of the image acquisition apparatus, of the workstation, of the system, and/or of the computer program product, which correspond to the described modifications and variations of the system, can be carried out by a person skilled in the art on the basis of the present description.

A person skilled in the art will appreciate that the method may be applied to multidimensional image data, e.g., to 2-dimensional (2-D), 3-dimensional (3-D) or 4-dimensional (4-D) images, acquired by various acquisition modalities such as, but not limited to, standard X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM).

BRIEF DESCRIPTION OF THE DRAWINGS

These and other aspects of the invention will be further elucidated and described with reference to the drawing, in which.

DETAILED DESCRIPTION OF EMBODIMENTS

The detailed description which follows describes several embodiments of the invention in detail. The details of these embodiments are not limiting the invention. Rather, they describe examples of possibly advantageous features which may be used in conjunction with the invention. The description describes in detail the combination of an anatomical image and a functional image. However, the invention may also be applied to other combinations of images. For example, two anatomical images may be used or two functional images may be used. When two anatomical images are used, the first image could comprise an MR image and the second image could comprise a CT image, for example, or in another example, two CT images or two MR images are used. This would allow to convert a region of interest defined in the first anatomical image to a corresponding region of interest in the second anatomical image. The first image may also be a functional image which has a region of interest marked on it either manually or automatically. For example, the region of interest of the first image could have been obtained via an anatomical image by applying the techniques described in this text. The second image may be a functional image which has been taken on a different subject or at a different time, to study the change in statistics using the marked region of interest.

Figure 1:
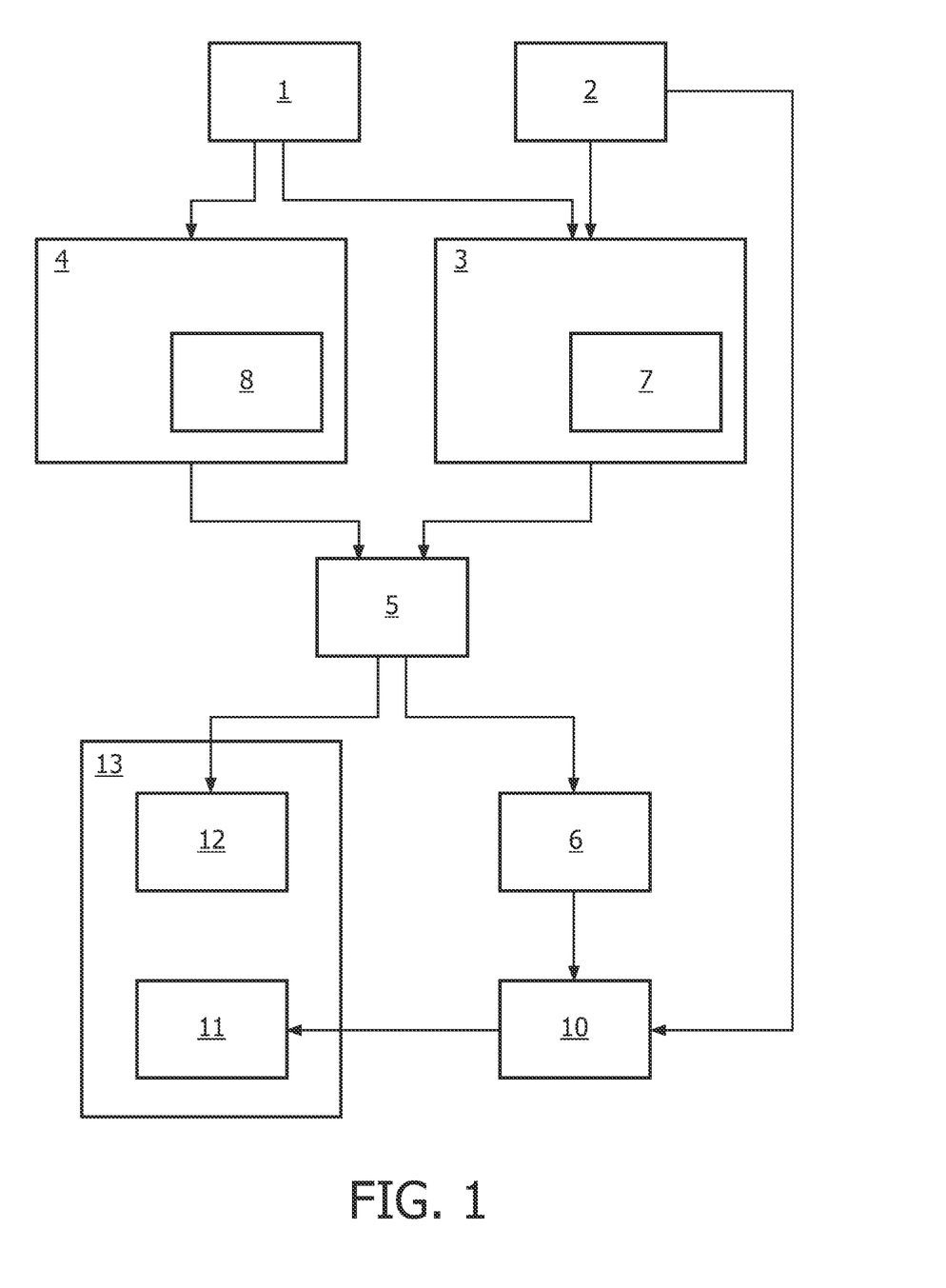
FIG. 1 shows a diagram of a system for quantification of medical image data.

FIG. 1 shows a block diagram of a system for quantification of medical image data. Such a system may be implemented on a computer by means of software, for example. The system may also be implemented in an image acquisition apparatus, in particular a medical image acquisition apparatus, or in a medical workstation. The system may comprise a processor for processing computer instructions, a memory for storing the computer instructions and image data, the memory may comprise a RAM or flash memory. A mass storage device, such as a hard disk, may be used to store the instructions permanently and/or to store image data, including quantifications of the image data. A data port may be provided for communication with a network, for example for exchange of image data and/or patient data with a server, such as a PACS server. The system shown in FIG. 1 may also be implemented by means of a dedicated electronic circuit, for example.

The system may comprise a first image obtaining means 1 for obtaining a first image A and a second image obtaining means 2 for obtaining a second image B. For example, the first image comprises an anatomical image, and the second image comprises a functional image. However, this is not a limitation. The image obtaining means 1 and 2 may comprise an image acquisition device, such as a CT and/or PET scanner. Alternatively, the image obtaining means 1 and 2 may be arranged for receiving the images via the data port from a network server, for example, or from a removable media or other storage means. The image obtaining means 1 and 2 may also be arranged for receiving metadata of the first image A and second image B, such as spatial resolution, modality, date the image was acquired.

The system may comprise spatial transformation obtaining means 3. This spatial transformation obtaining means 3 is arranged for obtaining spatial transformation information representing a correspondence between points in the first image and corresponding points in the second image. Such a transformation could, when applied to one of the images A or B, spatially transform that image such that it corresponds to the other image. The spatial transformation obtaining means 3 may be arranged for receiving the spatial transformation information from a network server, for example the same server from which the image data was received. The spatial transformation obtaining means 3 may also comprise registering means 7 for registering at least part of the first image with at least part of the second image to obtain the spatial transformation information. Such registration process is known in the art per se. In particular, the information describing the transformation applied to the image in the registration process is obtained by the spatial transformation obtaining means 3, rather than just the registered image to which the spatial transformation has been applied. This allows the system to apply the spatial transformation to other objects.

The system may comprise identifying means 4 for identifying a first image region C in the first image A. Such identifying means 4 may comprise a user interface 8 for enabling a user to indicate the first image region in the first image. Alternatively, the identifying means 4 may comprise a segmentation means for identifying, an image region C comprising an object such as an organ in the image. Such segmentation may be performed in a way known in the art per se and may be automatic or semi-automatic. The user interface 8 may comprise an option enabling the user to indicate that the first region should be retrieved from a storage means.

The system may comprise transforming means 5 for transforming the first image region C into a corresponding second image region C' in the second image based on the spatial transformation information. The transforming means 5 may be arranged for applying a transformation indicated by the spatial transformation information.

The system may comprise quantification means 6 for computing a quantification relating to the second image region by accessing image values of the second image within the second image region. These image values did not have to be resampled because the region C is transformed into region C' (that is, an identification of the region C is transformed into an identification of region C'). Consequently, the quantification means 6 can use the original image values of the second image B within the boundaries of the second image region C'.

The identifying means may be arranged for providing a boundary of the first image region C, for example by means of a description of a surface of the first image region C. The transforming means 5 may be arranged for transforming this boundary based on the spatial transformation information to obtain a boundary of the second image region C'. The surface description may contain a number of points on the surface, for example; these points may be transformed one-by-one using the spatial transformation information, to obtain a surface description representing the boundary of the second image region C'.

The spatial transformation information may represent, for example, a rigid, affine, non-rigid, or landmark-based transformation.

The system may comprise storage means for storing the spatial transformation information. The storage means may further be arranged for further storing a series instance UID, origin, pixel spacing, or image orientation of the first image or of the second image. This information may be used by the transforming means 5 as spatial transformation information, or the information may be used by the spatial transformation obtaining means 3 or registering means 7, in the process of obtaining a good transformation.

The system may comprise associating means 10 for associating the quantification with the first image region. For example, the quantification may be stored in a patient record as a quantification relating to the first image region. The quantification may also be recorded in a medical report as a quantification relating to the first image region.

The system may further comprise visualizing means 13. The visualizing means comprises for example a display. Such display may be part of a medical workstation or medical image acquisition apparatus, for example. On the display, several information may be displayed, such as the first image A, the second image B, and/or indications of the image regions C and/or C'. This visualizing means may be combined with the user interface 8. Visualizing means 13 may also be used to create reports of the patient status. The visualizing means 13 may comprise association visualizing means 11 for visualizing an indication of the association between the quantitative value and the first image region. For example, a visualization comprising the first image A, an indication of the first image region C, and an indication of the quantitative value is created by the association visualizing means 11. Alternatively, the association visualizing means 11 is arranged for visualizing a name of the first image region (for example, "heart"), along with the quantitative value. The visualizing means 13 may further comprise region visualizing means 12 for visualizing an indication of the second image region C' in the second image B. This allows the user to verify the correct operation of the spatial transformation obtaining means 3 and/or the transforming means 5.

Figure 2:
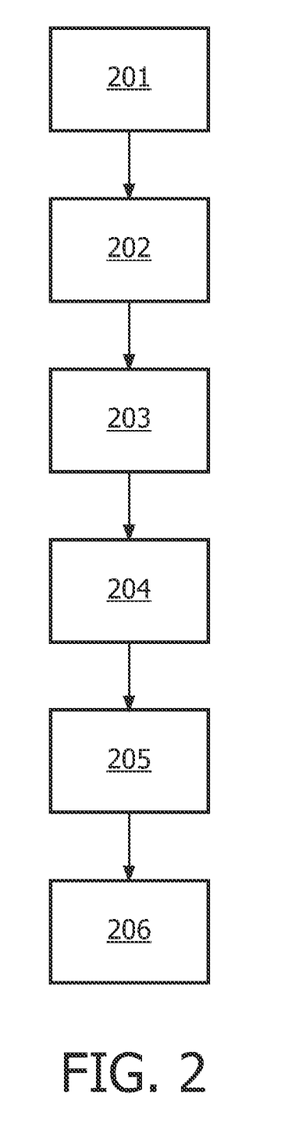
FIG. 2 shows a diagram of a method of quantification of medical image data.

FIG. 2 illustrates a method of quantification of image data. The method comprises step 201 of obtaining a first image, and step 202 of obtaining a second image. The method further comprises step 203 of obtaining spatial transformation information representing a correspondence between points in the first image and corresponding points in the second image. The method further comprises step 204 of identifying a first image region in the first image. The method further comprises step 205 of transforming the first image region into a corresponding second image region in the second image based on the spatial transformation information. The method further comprises step 206 of computing a quantification relating to the second image region by accessing image values of the second image within the second image region.

Medical imaging systems may be divided, more or less, into two types: Those which yield anatomical information (such as CT, MR, Ultrasound etc.) and those that yield functional information (such as PET, SPECT). However, it will be understood that this distinction is not strict. For example, in some applications, CT or MR may be used to acquire functional information. Increasingly, functional images are used for diagnostics of various diseases since they are capable of detecting problems earlier than it becomes visible as an anatomical abnormality. However, the main disadvantage of functional imaging is that it does not contain sufficient anatomic delineation and in order to be able to identify organ structures, it is advantageous to make use of the complementary information provided by anatomical imaging modalities such as CT or MR. Anatomical structures may be marked on the CT or MR images, either manually or automatically, and these regions may then be imported onto the functional images.

In order to transfer such anatomical reference obtained by anatomical imaging to the functional image, it is possible to align the anatomical and the functional image. This may be done with the help of registration techniques wherein the data is filtered and re-sampled and the target image (usually the functional image) is transformed to align with the reference system (usually the anatomical image). The filtering and re-sampling are applied to achieve an accurate registration. However, these filtering and re-sampling may cause the functional image to be deformed and thereby affects the quantitative values that the functional image represents. Quantitative values in a functional image are important for interpretation, and changes of these quantitative values can affect the accuracy of the results. Hence, a method may be preferred wherein the anatomical reference can be transferred to a functional image without deforming or affecting the intensity levels of the functional image.

To this end, a method is proposed in which the region marked in one image can be used in another image for quantitation without altering the values of either image. This may result in an increased accuracy of quantitation.

A region which is delineated in a single image may need to be re-used in other images. For example, the same region may be studied over a period of time, or the region may be analyzed with different types of information (anatomical, functional etc.). To this end, the region may be marked on multiple modalities. However, it is either manually cumbersome or impossible to mark the same region exactly in multiple images, especially if one of the imaging modalities happens to be a functional image with no anatomical references. The usual manner in which the region marked on one image is imported into another image is by using the image on which the region was marked as a reference and registering it with other images (which are used as target images). The target images are deformed in the process (since the process of registration involves some filtering and re-sampling as well) and the values are modified. This results in inaccurate quantification since the intensity values within the region are modified.

Consequently, the techniques described in this description permit a clinical or preclinical scientist or a clinical doctor to import a region marked in one reference image onto one or more target images without modifying the image.

The image on which the anatomical reference is marked and the image on which the region is to be imported and registered and the registration transform alone may be stored. Any modification to the target image which was done as a part of the registration is not used for quantification purposes. The registration transform (for example a rigid or affine transformation) is stored along with metadata information about the registration. This metadata may include an indication of which was the reference and which was the target image. The metadata may further include the Origin, pixel spacing and/or orientation information of the image on which the anatomical reference or region was marked. This transform (or a modification thereof, depending on the metadata) may be applied to the region which was marked (without changing the image). The transformed region is now aligned with the target position and can be used for quantification studies on the functional image.

Figure 3:
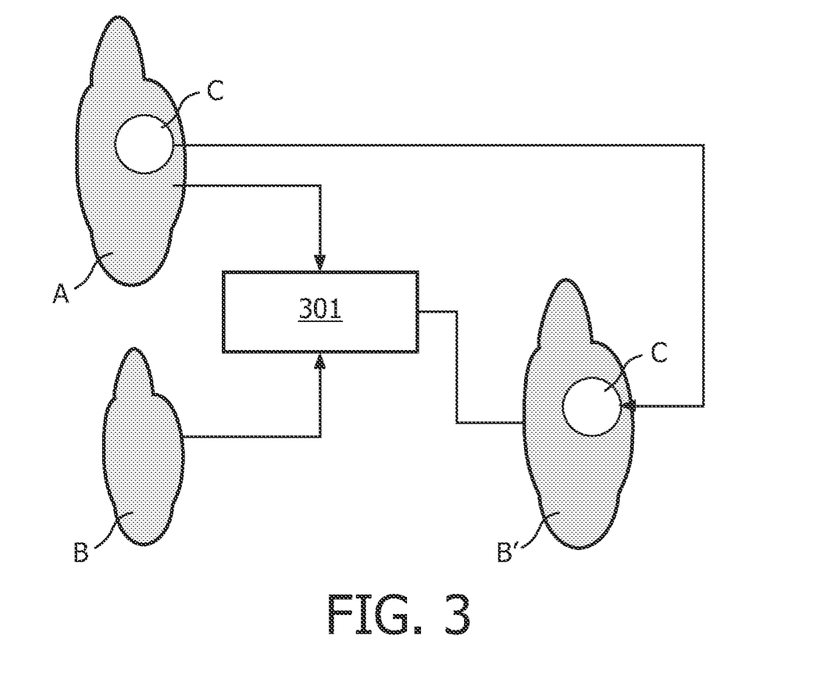
FIG. 3 shows a diagram of a registration of medical images.

FIG. 3 illustrates a registration process for quantification. A first image A comprises a first image region C. A second image B is also provided. The two images A and B are registered by registration means 301. In the process, the second image B is transformed such that the shape of the object represented by image B coincides with the same or a corresponding object represented by image A. This results in a deformed, registered version B' of the second image B. The region C indicated in image A can then be transferred to image B' without any changes. This process has the disadvantage of modifying image B and thereby the quantitative data that it represents.

Figure 4:
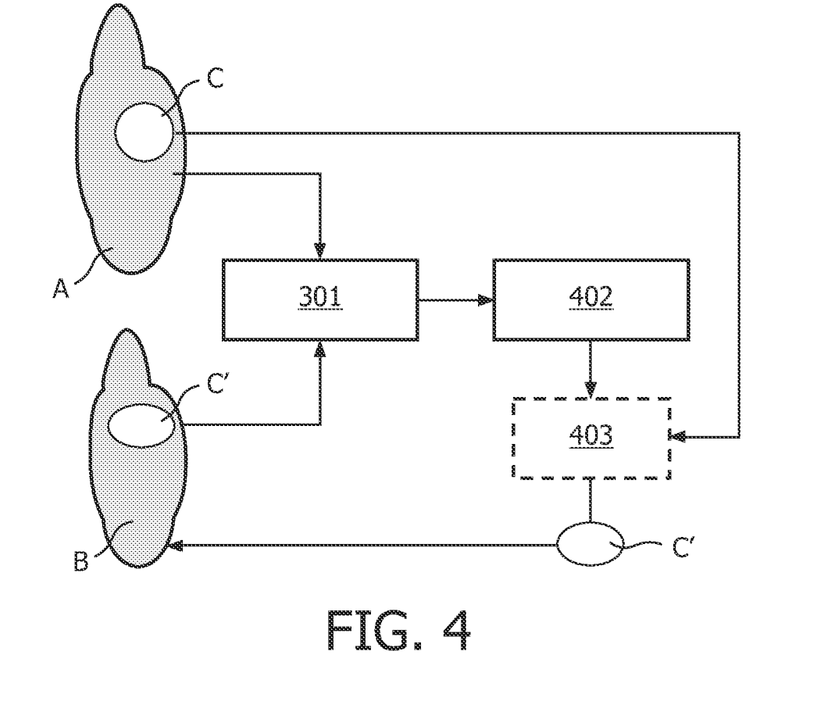
FIG. 4 shows a diagram of medical images including storing a spatial transformation.

FIG. 4 illustrates another process for quantification. The figure shows the same first image A and second image B and first image region C, as shown in FIG. 3. Moreover, the registration means 301 is similar to the one shown in FIG. 3. However, rather than storing a deformed version of image B (image B' of FIG. 3), in the process of FIG. 4, spatial transformation information 402 is stored. This information represents the correspondence between points in the two images A and B. For example, the transformation information 402 stores information allowing to provide coordinates in image A when given coordinates of a point in image B as an input. In this case, inverse transformation information 403 is also stored. Inverse transformation information 403 represents the transformation necessary to convert coordinates representing a point in image A into coordinates representing a corresponding point in image B. It is also possible to only store this latter transformation 403, omitting the transformation 402. The boundaries of the first image region C may be transformed using transformation information 403, which results in second image region C'. This second image region C' directly defines a region in image B, as indicated in FIG. 4. With the region C', it is possible to compute quantitative information relating to image region C', without using resampled image data as is the case in the system of FIG. 3.

The anatomical references (region C) which are either manually marked or determined using an automatic segmentation algorithm on the reference image A are stored separately. The image on which the region was marked (image A) and the image onto which the region is to be imported (image B) are registered using a known registration technique such as rigid, affine, non-rigid or landmark-based. The deformation values computed from such a transformation are stored (402) along with metadata related to the registration (the series UID of the images chosen as reference and target, origin, pixel spacing as well as the Image Orientation of the two images). The image Transform values obtained from the registration are then modified depending on the metadata and applied to the region to obtained a deformed region C'. The deformed region C' is now in the same frame of reference as image B and can be transferred onto image B on which quantification is to be performed.

In the analysis of functional medical images, a first step is often the registration of the function image with an anatomical image as reference. However, the process of registration itself can introduce changes in the quantitative values of the functional data. While it may be necessary to perform such a transformation to obtain a good registration or even to be able to filter the data to perform subsequent analysis, it is useful to quantify the difference that such a processing can make to the intensity values. This is because the intensity values actually correspond to a physical radioactive dosage and it is desirable to estimate the absolute physical quantity (in terms of radioactivity) in addition to a qualitative diagnosis. Hence, it is desirable to quantify the effect of registration in an analysis pipeline that leads to a final conclusion.

The process of registration may be followed by a process of segmentation and an analysis of a segmented volume. The segmentation may be carried out by a wide variety of methods known in the art per se. Following segmentation, analysis also can be carried out using a variety of options. In order to quantify the effect of registration, the it is possible to perform the analysis with and without registration, and compare the difference in the final quantitative data. However, since in many cases, it is difficult or impossible to perform segmentation of functional image data without a correct alignment with the anatomical data, removing the registration step from the analysis pipeline may not be an option. Hence, there is a need for a method which can allow the segmentation and the rest of the analysis pipeline to proceed without registration being performed.

A contour drawn on an anatomical image for the purpose of quantitation in a functional image may be stored. The contour may be obtained by the same procedure as in the pipeline to be analyzed for the effect of registration. The anatomical image and the functional image may be registered and the computed transform may be stored. The stored computed transform may be applied to the contour and imported onto the functional image. A contour has thus been obtained on the functional image by skipping the registration step. The rest of the analysis pipeline can now proceed. The results of the analysis pipeline with and without registration can then be compared to quantitatively assess the effect of registration on a specific type of analysis. This framework can also be used to assess the effect of various registration algorithms.

An example involves registration of a PET image to a CT image and calculating standardized uptake value (SUV) in a region of interest. The physician marks the region of interest in a well-resolved CT image. To apply this region of interest to the PET image, the PET image is typically registered to the CT image, so that the same region of interest can be applied there. The deformation of the PET image due to registration typically only matches the spatial coordinates, but does not conserve the intensity values (often a simple resampling is used). However, for quantitatively correct results it would be desirable to transform the intensity values as well, because a region which grows due to registration should decrease in intensity per voxel. Such an "intensity conserving" transform is in principle possible, but difficult to implement. Such an "intensity conserving" transform may be avoided. Registration from PET on CT may be done to use the inverse transform for the region of interest surface (rather than transforming the image data itself). The transformed region of interest may be applied to the unmodified PET image. The correct intensity values in the original PET image are obtained (e.g., to calculate the SUV in the region of interest). This concept allows the physician to work with the "native" CT (mark region of interest) and PET images (calculate SUV).

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. It will also be appreciated that such a program may have many different architectural designs. For example, a program code implementing the functionality of the method or system according to the invention may be subdivided into one or more subroutines. Many different ways to distribute the functionality among these subroutines will be apparent to the skilled person. The subroutines may be stored together in one executable file to form a self-contained program. Such an executable file may comprise computer executable instructions, for example processor instructions and/or interpreter instructions (e.g. Java interpreter instructions). Alternatively, one or more or all of the subroutines may be stored in at least one external library file and linked with a main program either statically or dynamically, e.g. at run-time. The main program contains at least one call to at least one of the subroutines. Also, the subroutines may comprise function calls to each other. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth. These instructions may be subdivided into subroutines and/or be stored in one or more files that may be linked statically or dynamically.

The carrier of a computer program may be any entity or device capable of carrying the program. For example, the carrier may include a storage medium, such as a ROM, for example a CD ROM or a semiconductor ROM, or a magnetic recording medium, for example a floppy disc or hard disk. Further the carrier may be a transmissible carrier such as an electrical or optical signal, which may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of quantification of image data, comprising:
   obtaining spatial transform information representing a correspondence between points in a first non-transformed image and corresponding points in a second non-transformed image;
   storing the spatial transform information in a computer memory;
   identifying a first image region in the first non-transformed image;
   with one or more processors, transforming the identified first image region to identify a corresponding second image region in the second non-transformed image based on the spatial transform information; and
   with the one or more processors, computing a quantification value relating to the second image region based on image values of the second non-transformed image within the second image region and image values of the first non-transformed image accessed from the first non-transformed image in accordance with the stored spatial transform.

2. A non-transitory computer program product comprising instructions for causing a processor system to perform the steps of the method according to claim 1.

3. A system for quantification of medical data, comprising:
   one or more processors configured to:
   obtain a spatial transform representing a correspondence between points in an original first image and corresponding points in an original second image, including registering at least part of the original first image with at least part of the original second image to obtain the spatial transform;
   store the spatial transform;
   identify a first image region in the original first image;
   identify a second image region in the original second image by transforming the identified first image region into the original second image;
   compute a quantitative value using pixel values within the identified second image region of the original second image and corresponding pixels values retrieved directly from within the first identified region of the original first image using the stored transform or an inverse of the stored transform.

4. The system according to claim 3, wherein the one or more processors are further configured to:
   obtain the original first image and the original second image, each non-transformed, from one of:
   respective acquisition devices; or
   computer storage.

5. The system according to claim 3, wherein identifying the first image region includes identifying a boundary of the identified first region in the original first image; and identifying the second image region includes transforming the boundary of the identified first region to the original second image; and further including:

a display controlled by the one or more processors to display the computed quantitative pixel values and at least one of: the original first image with the identified boundary of the first region and the original second image with the identified boundary of the second image region.

6. A system for quantification of medical image data, comprising:

spatial transformation obtaining means for obtaining spatial transformation information representing a correspondence between points in an original first image (A) and corresponding points in an original second image (B), the spatial transformation obtaining means comprising registering means for registering at least part of the original first image (A) with at least part of the original second image (B) to obtain the spatial transformation information, wherein the registering results in a deformed, registered version (B') of the original second image (B);

storing means for storing the spatial transformation information;

identifying means for identifying a first image region (C) in the original first image (A);

transforming means for transforming the first image region (C) into a corresponding second image region (C') in the original second image (B) based on the stored spatial transformation information; and quantification means for computing quantitative information relating to the second image region (C') by accessing original image values of the original second image (B) with the second image region (C').

7. The system according to claim 6, wherein the original first image (A) is an anatomical image, the original second image (B) is a functional image.

8. The system according to claim 6, wherein the identifying means identifies a boundary of the first image region (C), and the transforming means transforms the boundary based on the stored spatial transformation information to obtain a boundary of the second image region (C').

9. The system according to claim 3, wherein the first image comprises an anatomical image, the second image comprises a functional image.

10. The system according to claim 5, further including:

a user input device configured to receive user input to identify or adjust the boundary of the first image region.

11. The system according to claim 3, wherein the processors are configured to:

perform the transforming of the first image region into the corresponding second image region in the original second image based on a series instance identifier, origin, pixel spacing, or image orientation of the original first image or of the original second image.

12. A medical image acquisition apparatus comprising means for acquiring the original first image and the original second image and further comprising the system according to claim 3.

13. A medical workstation comprising the system according to claim 3.

14. The system according to claim 9, wherein the computed quantitative value includes a standardize uptake value (SUV) based on an inverse transform from the original second image to the original first image.

* * * * *